United States Patent [19]
Mizuno et al.
[11] Patent Number: 4,491,851
[45] Date of Patent: Jan. 1, 1985

[54] METHOD AND CIRCUIT FOR DRIVING AN INK JET PRINTER

[75] Inventors: Tsuneo Mizuno, Yokohama; Shigeru Yoshikawa, Tokyo; Tadashi Matsuda, Yokohama, all of Japan
[73] Assignee: Fujitsu Limited, Kawasaki, Japan

[21] Appl. No.: 168,323
[22] Filed: Jul. 11, 1980
[30] Foreign Application Priority Data
Jul. 18, 1979 [JP] Japan ........ 54-90447
[51] Int. Cl.³ ........ G01D 15/18
[52] U.S. Cl. ........ 346/1.1; 346/140 R
[58] Field of Search ........ 346/1.1, 75, 140 R, 346/140 PD; 400/126

[56] References Cited
U.S. PATENT DOCUMENTS
3,334,351 8/1967 Stauffer ........ 346/75
3,683,396 8/1972 Keur et al. ........ 346/1.1
3,893,131 7/1975 Perel et al. ........ 346/75 X
3,928,855 12/1975 Helinski et al. ........ 346/1.1
4,104,646 8/1978 Fischbeck ........ 346/140 R
4,161,670 7/1979 Kern ........ 346/140 PD
FOREIGN PATENT DOCUMENTS
2555749 6/1977 Fed. Rep. of Germany .
48-9622 2/1973 Japan .

*Primary Examiner*—Richard A. Wintercorn
*Assistant Examiner*—W. J. Brady
*Attorney, Agent, or Firm*—Staas & Halsey

[57] ABSTRACT

A method for driving an ink jet printer which includes an electro-mechanical transducer which is operated by electrical pulses to eject ink from an ink nozzle connected to pressure chamber wherein two successive electrical pulses are supplied to the transducer before the ejected ink is separated from the remaining ink in the pressure chamber.

5 Claims, 14 Drawing Figures

METHOD AND CIRCUIT FOR DRIVING AN INK JET PRINTER

BACKGROUND OF THE INVENTION

This invention relates to a method and circuit for driving an ink jet printer which comprises an electro-mechanical transducer which operates in response to electrical pulses to effect ink jet printing on a medium.

There has been proposed an ink jet printer, as illustrated in FIG. 1, which comprises a pressure chamber 1 containing ink, an ink nozzle 3 connected to the pressure chamber 1, through which the ink is ejected, and a piezoelectric crystal 5 which is actuated by electrical driving pulses to eject the ink from the ink nozzle onto a printing medium 10. When the ink is ejected from the ink nozzle 3, the ejected ink which is separated from the remaining ink in the pressure chamber 1 forms ink droplets. The pressure chamber 1 is connected to an ink supply source (not shown) by way of an ink supply passage 2.

The circular disc shaped piezoelectric crystal 5, together with a metal plate 6 which is rigidly connected to the crystal 5, forms an electro-mechanical transducer 4. The transducer 4 is connected to an electrical driving circuit (not shown). The metal plate 6 is electrically grounded and a positive voltage is applied to the crystal 5. When positive voltage driving pulses are supplied to the crystal 5, the crystal 5 is mechanically contracted, so that the metal plate 6 is bent toward the pressure chamber 1 to press the ink in the pressure chamber 1. As a result, the ink in the pressure chamber 1 is ejected from the ink nozzle 3, in the form of ink droplets. Then, when the voltage which has been applied to the crystal 5 is removed, the crystal 5 is returned to its original position, the metal plate 6 returns to its original position, and the pressure in the pressure chamber 1 decreases. Thereafter, the pressure chamber is refilled with ink through the passage 2 by the capillary force at the ink nozzle 3.

In the prior art, a driving pulse having a wave form as illustrated in FIGS. *2a, 2b,* or *2c* is applied to the transducer 4 to operate the same. That is, one pulse is applied to the transducer for one ejection of the ink from the nozzle. However, in the prior art, a satellite droplet or satellite droplets 20' tends or tend to occur behind the main ink droplet 20, as illustrated in FIG. 3. When the ink is ejected from the nozzle 3, the front end of the ink moving out of the nozzle 3 is first connected to the ink in the pressure chamber 1 by a long thin tail 22, and is then separated from the ink in the pressure chamber 1, so that the ink droplet 20 and the satellite droplets 20' are produced. The satellite droplets 20' have a bad effect on the appearance of the printed surface of the medium 10 and, accordingly, it is preferable that no such droplets be produced.

Furthermore, the long thin tail 22 which is located in the nozzle 3 often shifts from the center line l—l of the nozzle 3, by the distance e, due to "surface tension", as illustrated in FIG. 4. In addition, the meniscus of the ink often becomes distorted, when the nozzle 3 has a rough surface on the inner face thereof or when the nozzle 3 has a shifted center. The shifted tail 22 or the distorted meniscus causes the ink droplet to be shifted from the center line l—l of the nozzle 3, as illustrated in FIG. 4(*b*), so that the shifted ink droplet will be applied at an incorrect printing position of the medium 10 (FIG. 1).

Furthermore, after the ink droplet is separated from the remaining ink in the pressure chamber 1 at the tail 22, air may penetrate the ink in the pressure chamber 1, when the plate 6 is returned to its original position, so that air bubbles are produced in the ink. The air bubbles decrease the pressure which is applied to the ink in the pressure chamber 1, since a part of the pressure is absorbed by the air bubbles which can be compressed.

In order to eliminate the above mentioned drawbacks, a so called Stemme type print head for a ink jet printer has been proposed (See Japanese Patent Laid Open No. 48-9622). That print head comprises an inner ink chamber (i.e. pressure chamber) and an outer ink chamber. These ink chambers are interconnected by a first nozzle, and the outer ink chamber is also connected to a second nozzle for ejecting the ink. In this print head, since the tensile force for displacing the ink in the second nozzle toward the first nozzle is relatively small, the ink droplet is separated from the ink at the outlet portion of the second nozzle that is located adjacent to the ejection opening of the second nozzle, which results in the prevention of the occurrence of the long thin tail mentioned above. However, the Stemme type print head is complex and it is very difficult to align the first and second nozzles.

SUMMARY OF THE INVENTION

The object of the present invention is therefore to eliminate the drawbacks mentioned above by providing an improved method and apparatus for driving a printer without modifying the construction of thereof.

The invention will be discussed below, with reference to the accompanying drawings, in which like numerals refer to like parts throughout.

DETAILED DESCRIPTION OF THE PREFERRED EMBODIMENT

According to the present invention, two successive pulses are supplied to the transducer 4 (FIG. 1) before the ink droplet is separated from the ink in the pressure chamber 1, so that the piezoelectric crystal 5 (FIG. 1) is subject to two successive mechanical contractions. Two such pulses are exemplified in FIGS. 5 (*a*)–(*d*). However, it should be noted that the wave forms of the two pulses are not limited to those in FIGS. 5 (*a*)–(*d*).

Figure 6:
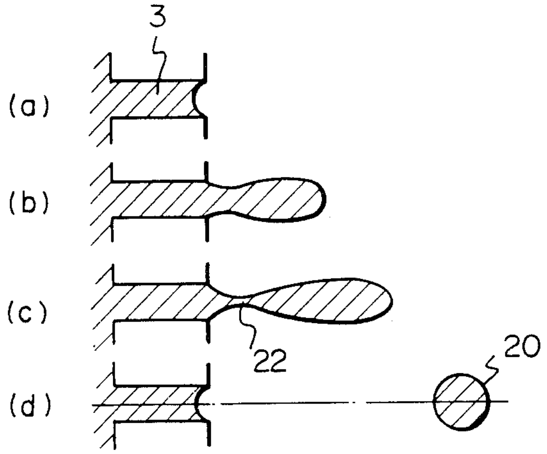
FIGS. 6 (*a*), (*b*), (*c*) and (*d*) are views showing successive steps of the formation of an ink droplet in accordance with according to the present invention.

By supplying two successive pulses to the transducer 4, the ink tail which tends to be displaced into the nozzle 3 is pushed out. That is, the second pulse results in additional pressure being applied to the ink, so that the tail 22 (FIG. 6) is pushed out of the nozzle 3. Accordingly, no satellite droplet is produced, and no off-set location of the ink droplet 20 occurs, as illustrated in FIGS. 6 (*a*)–(*d*).

The interval between the two contractions of the piezoelectric crystal 5 (FIG. 1) depends on the construction of the print head to be used and on the physical and chemical characteristics of the ink to be used. It has been experimentally confirmed that an optimum interval is generally within the range of 20 to 100 [μsec]. Furthermore, it has been also experimentally found that the peak value of the second pulse is preferably smaller than that of the first pulse.

Figure 5:
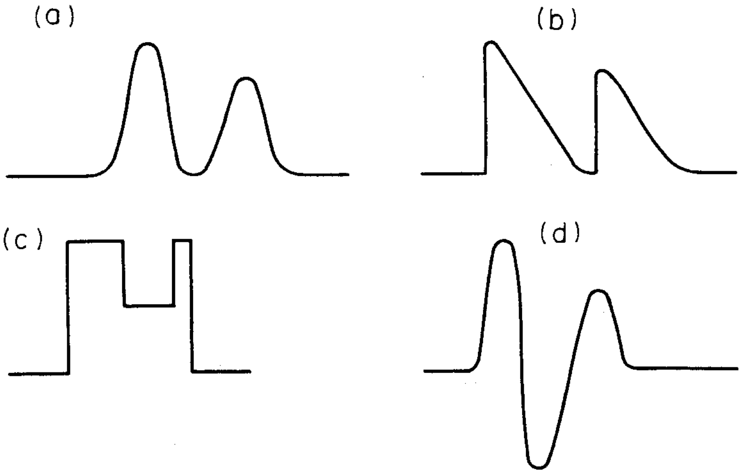
FIGS. 5 (*a*), (*b*), (*c*) and (*d*) are views showing different wave forms of pulses which are utilized in the method of the present invention.
Figure 7:
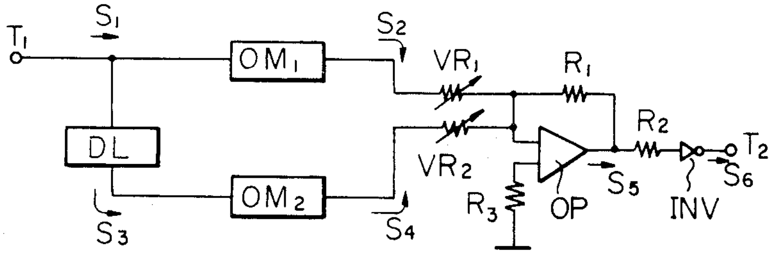
FIG. 7 is a diagram showing an electrical circuit in accordance with the present invention, which produces driving pulses having wave forms as illustrated in FIGS. 5 (*a*), (*b*), (*c*) or (*d*)
Figure 8:
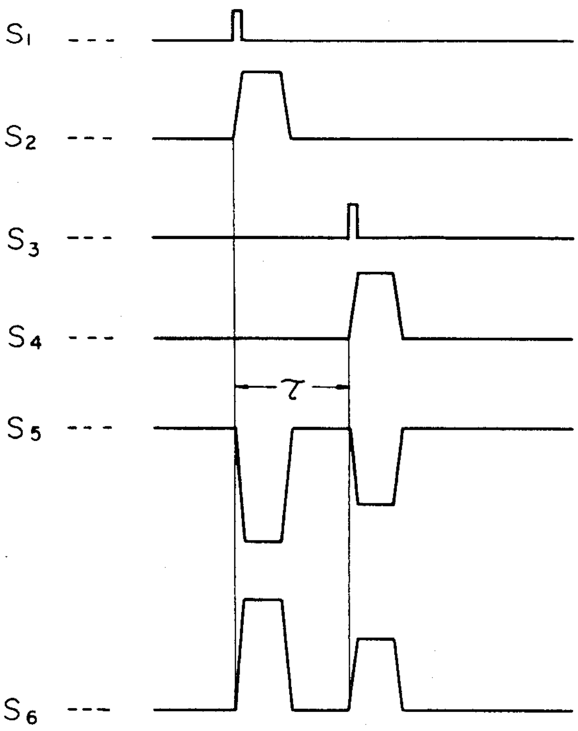
FIG. 8 shows pulses which are produced by the circuit shown in FIG. 7.

FIG. 7 illustrates an electrical circuit, in accordance with the present invention, which can produce the two successive pulses illustrated in FIGS. 5 (*a*), (*b*), (*c*) or (*d*). When a printing signal $S_1$, as illustrated in FIG. 8, is supplied to a terminal $T_1$, the signal $S_1$ is fed to a one-shot multivibrator circuit $OM_1$ and, also, to another one-shot multivibrator circuit $OM_2$ via a delay circuit DL. The delay circuit DL supplies a delayed signal $S_3$, as illustrated in FIG. 8, to the one-shot multivibrator $OM_2$. As a result, an output signal $S_4$ of the multivibrator $OM_2$ is delayed by a delay time $\tau$ (FIG. 8) with respect to an output signal $S_2$ of the $OM_1$. The multivibrator signals $S_2$ and $S_4$ are amplified by an operational amplifier OP. An output signal $S_5$ of the operational amplifier OP is inverted by an inverter INV, and a driving signal $S_6$ thus obtained is supplied to a terminal $T_2$ and, then, to the transducer 4. Thus, a driving signal consisting of the two successive pulses, as denoted by $S_6$ in FIG. 8, is produced.

Two variable resistances $VR_1$ and $VR_2$ control the peak values of the first and second pulses of the signal $S_6$, respectively. The peak value of the first pulse of the signal $S_6$ is of such a magnitude that the ink droplet is ejected from the nozzle, and the peak value of the second pulse of the signal $S_6$ is of such a magnitude that no satellite droplet is produced.

Figure 1:
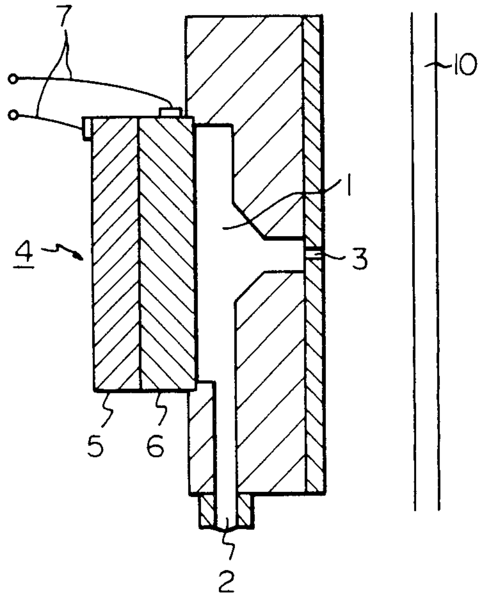
Fig. 1 PRIOR ART
FIG. 1 is a sectional view of a print head of an ink jet printer, to which the present invention is applied.
Figure 2:
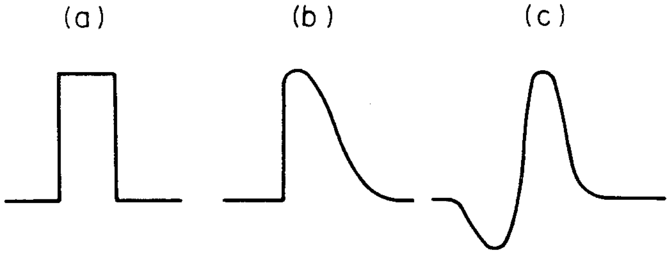
Fig. 2 PRIOR ART
FIGS. 2 (*a*), (*b*) and (*c*) show different wave forms of conventional driving pulses which are supplied to a printer.
Figure 9:
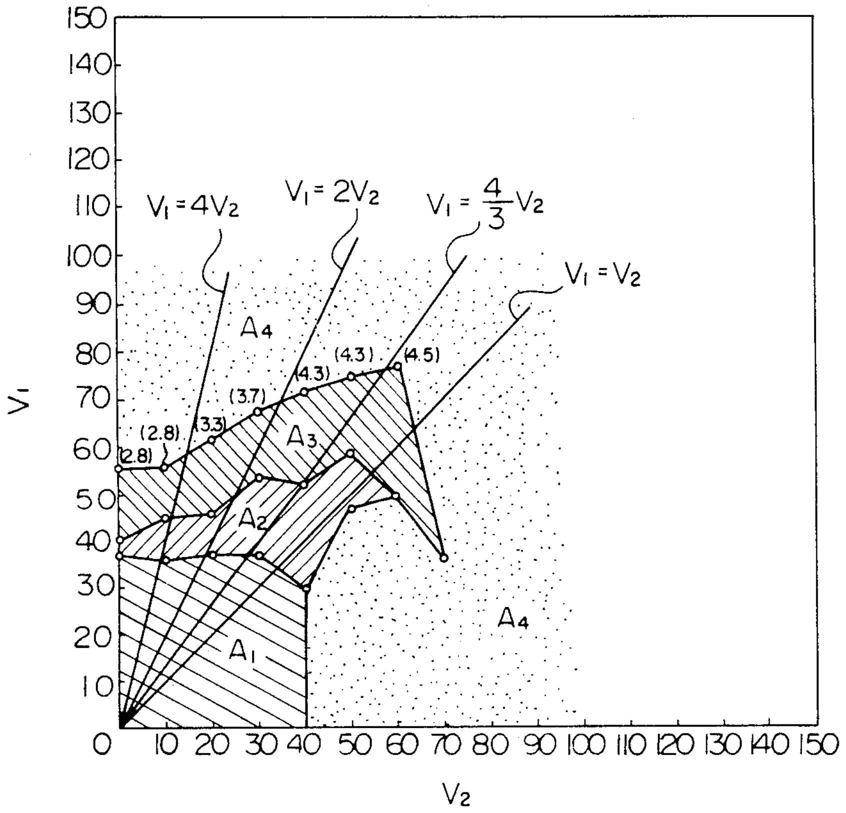
FIG. 9 shows experimental results of the present invention for determining optimum peak values of the driving pulses.
Figure 10:
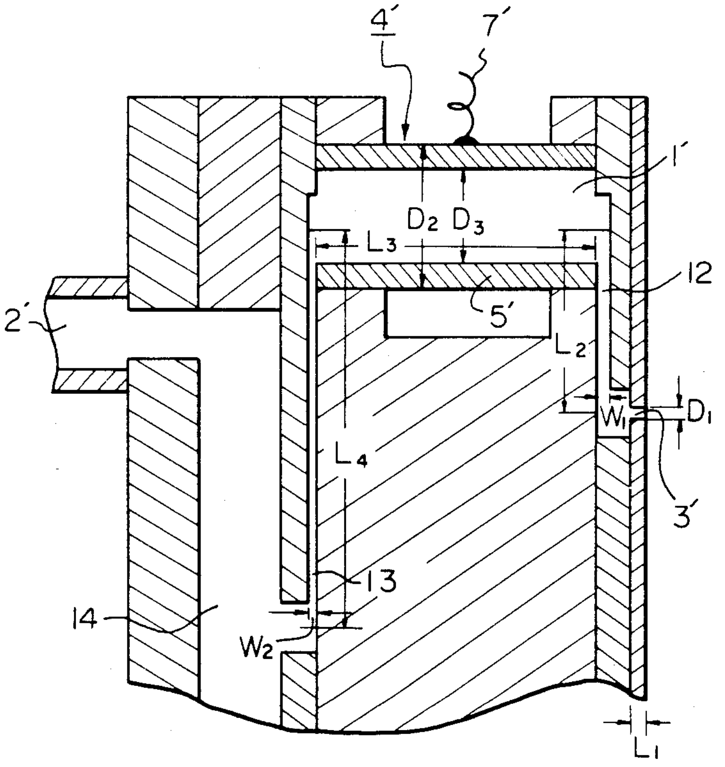
Fig. 10 PRIOR ART
FIG. 10 is a sectional view of a print head for an ink jet printer used in experiments conducted for confirming the technical advantages of the present invention.

FIG. 9 illustrates experimental results obtained with the method and circuit of the present invention. The experiments were conducted using a print head as illustrated in FIG. 10. In FIG. 10, the head comprises annular piezoelectric crystals 5' in place of the circular crystal 5 in FIG. 1, and the metal plate 6 illustrated in FIG. 1 is not provided. Pressure chambers 1' are formed in annular crystals 5' and are connected to nozzles 3' by means of connecting passages 12. The print head illustrated in FIG. 10 has eight nozzles 3' (only one of which is illustrated) and eight crystals 5' (only one of which is illustrated). The numeral 14 designates a common ink chamber which is connected to the pressure chambers 1' by means of supply passages 13 (only one of which is illustrated). The ink chamber 14 is connected to an ink tank (not shown) by means of a conduit 2'. The dimensions and material of the elements 3', 12, 5' and 13 used in the experiment were as shown in table 1, below.

TABLE 1

| ELEMENT | DIMENSIONS AND MATERIAL |
|---|---|
| nozzle 3' | Diameter $D_1 = 60\ \mu m^{\phi}$ |
| | Length $L_1 = 100\ \mu m$ |
| | Material: SUS 304 |
| connecting passage 12 | Width $W_1 = 0.4$ mm |
| | Depth $H_1 = 0.2$ mm (not shown) |
| | Length $L_2 = 10$ mm |
| piezo-electric crystal 5' | Outer Diameter $D_2 = 2\ mm^{\phi}$ |
| | Inner Diameter $D_3 = 1.5\ mm^{\phi}$ |
| | Length $L_3 = 11$ mm |
| | Material: NEPEC 21 |
| supply passage 13 | Width $W_2 = 0.2$ mm |
| | Depth $H_2 = 0.1$ mm (not shown) |
| | Length $L_4 = 20$ mm |

In the experiment distilled water was used in place of ink. The temperature and humidity of the atmosphere were 21° C. and 47%, respectively.

Figure 11A:
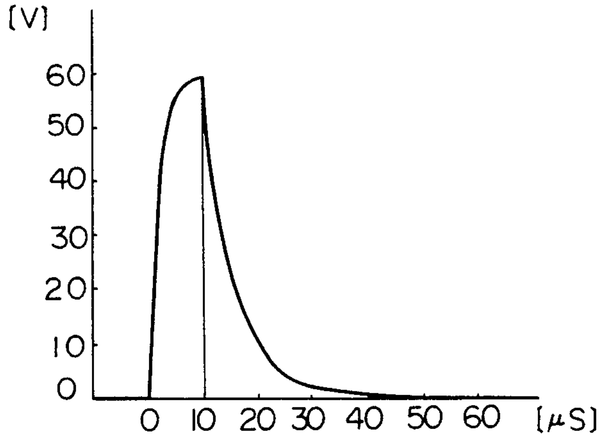
Fig. 11A PRIOR ART
FIGS. 11A and 11B show driving pulses of a prior art method and the present invention, respectively.
Figure 11B:
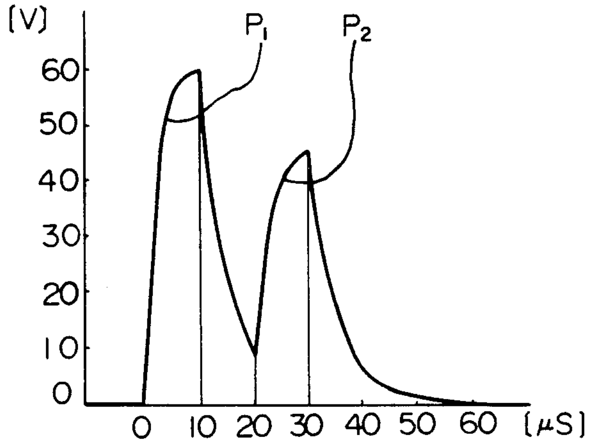

The driving pulses supplied to the transducer 4' were those illustrated in FIG. 11B. The peak values of the first and second pulses $P_1$ and $P_2$ were 60 V and 45 V, respectively. The rising time constants of the two pulses were both 5 μsec. The delay time $\tau$ (FIG. 8) was 20 μsec.

In FIG. 9, the vertical axis $V_1$ and the horizontal axis $V_2$ designate peak values of the first pulse and the second pulse, respectively. The area $A_1$ is a non-ink droplet area in which no ink was ejected from the nozzle and, accordingly, no printing could be effected. The area $A_2$ is a non-satellite droplet area in which no satellite droplet was produced. The area $A_3$ is a fast-satellite droplet area in which, although a satellite droplet (droplets) was (were) produced, it (they) collided with a main ink droplet which was moving in front of the satellite droplet (droplets), so that the satellite droplet (droplets) was (were) absorbed in the main ink droplet before the ink droplet reached the printing medium. The area $A_4$ is a satellite droplet area in which a satellite droplet (droplets) was (were) produced.

Obviously only the non-satellite droplet area $A_2$ and the fast-satellite droplet area $A_3$ can be used to achieve the object of the present invention. Accordingly, $V_1$ and $V_2$ are so selected that they are within the area $A_2$ or $A_3$. Since the main parts of the areas $A_2$ and $A_3$ are located above a line which is represented by the equation $V_1 = V_2$, $V_1$ and $V_2$ are preferably selected in such a manner that $V_1$ is larger than $V_2 (V_1 > V_2)$.

It should be noted that the larger the velocity of the ink droplet, the better the quality of the printed surface of the printing medium, but the possibility of the production of a satellite droplet is also increased. In this regard, increasing the voltage of the driving pulses supplied to the transducer increases the velocity of the ejected ink droplet. From the experiments, it was also found that, according to the invention, the voltage of the driving pulses can be increased, over the voltage used in the prior art, without the production of a satellite droplet. The parenthetical numerals 2.8, 3.3, 3.7, 4.1, 4.3 and 4.5 in FIG. 9 are velocities [m/s] of the ink droplets.

Figure 12B:
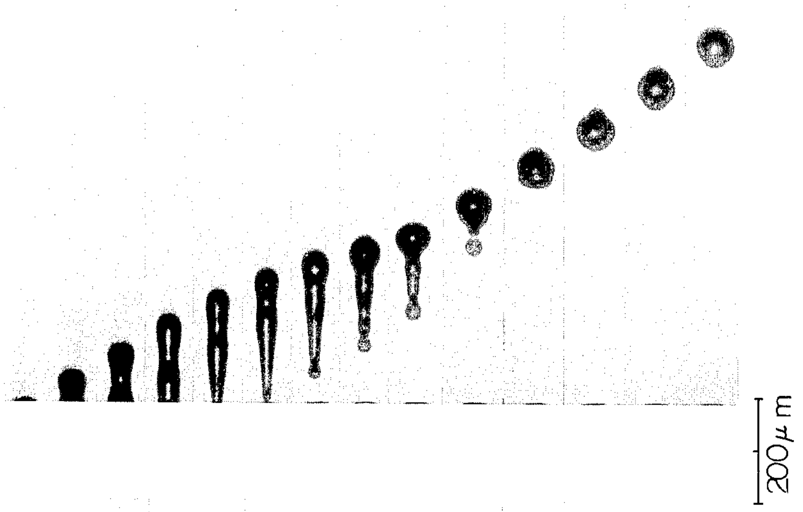
FIGS. 12A and 12B are photographs showing experimental results of the successive steps of the formation of the ink droplet, according to a prior art method and to the present invention, respectively.
Figure 12A:
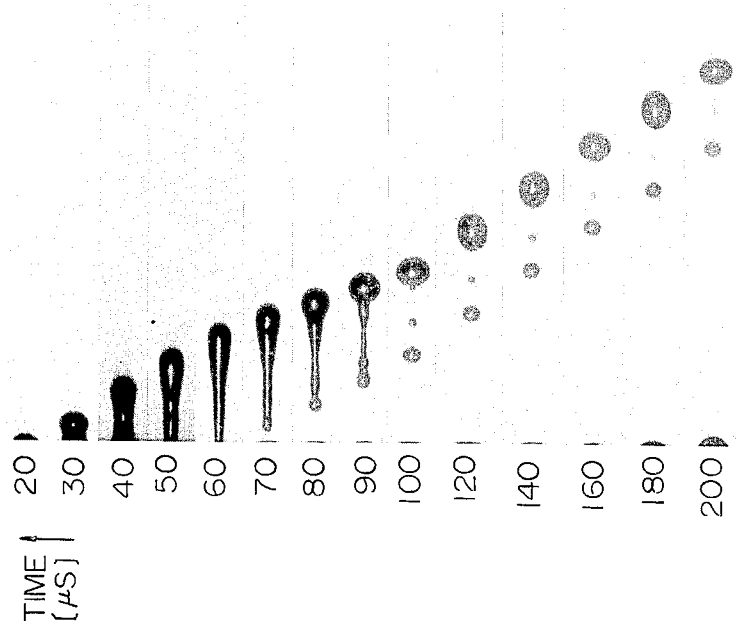
Fig. 12A PRIOR ART

FIGS. 12A and 12B are photographs showing successive steps in the formation of an ink droplet, according to the prior art and the present invention, respectively. FIG. 12A was obtained during an experiment in which the same ink head as illustrated in FIG. 10 was used and the single pulse type of driving pulses, shown in FIG. 11A, was supplied to the transducer. As can be seen from FIGS. 12A and 12B, satellite droplets are produced using the prior art, whereas no satellite droplet is produced using the present invention.

Figure 3:
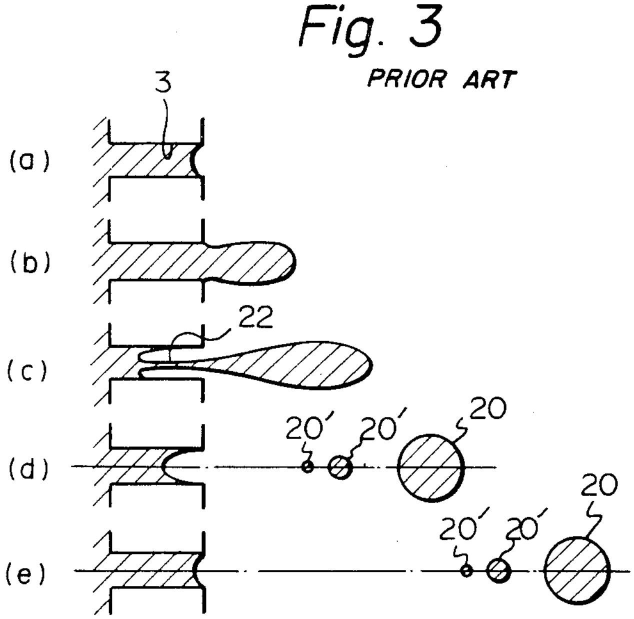
Fig. 3 PRIOR ART
FIGS. 3 (*a*), (*b*), (*c*), (*d*) and (*e*) are views which show conventional successive ejection steps of an ink.
Figure 4:
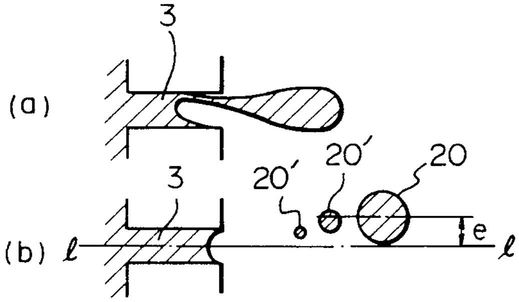
Fig. 4 PRIOR ART
FIGS. 4 (*a*) and (*b*) are views which show successive steps of the formation of an off-set ink droplet.

Furthermore, according to the present invention, since no long thin tail 22 (FIG. 3) exists in the nozzle, the ink droplet can be ejected along and on the centerline of the nozzle.

In addition, according to the present invention, since the ejection velocity of the ink droplet can be increased, high quality printed products can be obtained.

The present invention is applicable to any kind of drop-on-demand type print head.

We claim:

1. A method for driving an ink jet printer having a pressure chamber containing ink, an ink nozzle connected to the pressure chamber through which the ink is ejected, and an electro-mechanical transducer for transforming an electrical signal applied thereto into a mechanical deformation thereof and for ejecting the ink from the ink nozzle in dependence upon the mechanical deformation, thereby to apply an ink droplet onto a medium to be printed, said method comprising:

supplying a first electrical pulse to said electro-mechanical transducer thereby deforming said electro-mechanical transducer and causing the ink droplet to be ejected from the ink nozzle; and supplying a second successive electrical pulse to said electro-mechanical transducer before the ink droplet is separated from the remaining ink in the pressure chamber, where the second electrical pulse has a smaller peak value than the first electrical pulse and the peak values of the first pulse and the second pulse are approximately in the ratio of four to three, respectively, thereby applying additional pressure to a tail of the ink droplet.

2. A method for driving an ink jet printer, having an ink nozzle and an electro-mechanical transducer, for transforming an electrical signal applied thereto into a mechanical deformation thereof and for ejecting ink from the ink nozzle in dependence upon the mechanical deformation, the ink jet printer for applying an ink droplet to a print medium, said method comprising:

applying a first electrical pulse to said electro-mechanical transducer to actuate said electro-mechanical transducer, thereby deforming said electro-mechanical transducer and causing an ink droplet to be ejected from the ink nozzle; and applying a second electrical pulse to said electro-mechanical transducer before the ejected ink droplet has separated from the ink remaining in the ink nozzle, where the amplitude of the second electrical pulse is smaller than the amplitude of the first electrical pulse, thereby applying additional pressure to a tail of the ink droplet.

3. The method as set forth in claim 2, wherein the time interval between the first and second electrical pulses is in the range of from twenty to one hundred microseconds.

4. A circuit for driving an ink jet printer, having an ink nozzle and an electro-mechanical transducer for ejecting an ink droplet from the ink nozzle onto a print medium, said circuit comprising:

means for providing a print signal;

a delay circuit, operatively connected to said means for supplying the print signal, for generating a delayed print signal;

a first multivibrator circuit, operatively connected to said means for supplying the print signal, for providing, as an output, a first pulse signal;

a second multivibrator circuit, operatively connected to said delay circuit, for providing, as an output, a second pulse signal;

a first variable resistor connected to the output of said first multivibrator circuit;

a second variable resistor connected to the output of said second multivibrator circuit;

an operational amplifier, having an input connected to said first and second variable resistors, for providing, as an output, a driving signal to said electro-mechanical transducer.

5. The circuit as set forth in claim 4, further comprising:

an inverter circuit operatively connected between the output of said operational amplifier and said electro-mechanical transducer.

* * * * *